(12) United States Patent
Chastine et al.

(10) Patent No.: US 8,333,307 B2
(45) Date of Patent: Dec. 18, 2012

(54) LIQUID DISPENSING MODULE

(75) Inventors: Christopher R. Chastine, Lawrenceville, GA (US); Brett A. Pearson, Duluth, GA (US); John M. Riney, Buford, GA (US)

(73) Assignee: Nordson Corporation, Westlake, OH (US)

( * ) Notice: Subject to any disclaimer, the term of this patent is extended or adjusted under 35 U.S.C. 154(b) by 588 days.

(21) Appl. No.: 12/574,340

(22) Filed: Oct. 6, 2009

(65) Prior Publication Data

US 2011/0079618 A1    Apr. 7, 2011

(51) Int. Cl.
*B67D 3/00* (2006.01)

(52) U.S. Cl. ...................................... 222/542; 251/335.1

(58) Field of Classification Search .................. 222/542, 222/504–510, 518, 559; 277/628, 630; 251/335.1–335.3
See application file for complete search history.

(56) References Cited

U.S. PATENT DOCUMENTS

| | | |
|---|---|---|
| 3,211,416 A * | 10/1965 | Billeter et al. ................. 251/54 |
| 3,759,425 A | 9/1973 | Lee |
| 3,982,724 A | 9/1976 | Citrin |
| 4,066,188 A | 1/1978 | Scholl et al. |
| 4,126,321 A | 11/1978 | Harjar et al. |
| 4,359,204 A | 11/1982 | Williams |
| 4,583,662 A | 4/1986 | Silverthorn et al. |
| 4,651,906 A | 3/1987 | Hoffmann et al. |
| 4,712,576 A * | 12/1987 | Ariizumi et al. .............. 137/270 |
| 5,114,055 A | 5/1992 | Worth |
| 5,152,500 A | 10/1992 | Hoobyar et al. |
| 5,244,152 A | 9/1993 | Hofmann |
| 5,292,068 A | 3/1994 | Raterman et al. |
| 5,447,254 A | 9/1995 | Hoover et al. |
| 5,535,919 A | 7/1996 | Ganzer et al. |
| 5,598,974 A | 2/1997 | Lewis et al. |
| 5,630,444 A | 5/1997 | Callaghan et al. |
| 5,645,224 A | 7/1997 | Koch |
| 5,678,803 A | 10/1997 | Shinohara et al. |
| 5,794,825 A | 8/1998 | Gordon et al. |
| 5,853,124 A | 12/1998 | Beck et al. |
| 5,899,385 A | 5/1999 | Hofmann et al. |
| 5,957,343 A | 9/1999 | Cavallaro |
| 6,056,155 A | 5/2000 | Byerly et al. |

(Continued)

FOREIGN PATENT DOCUMENTS

CH            179551 A        9/1935

(Continued)

OTHER PUBLICATIONS

EFD, Piston Valves Systems for Precise Deposits of Viscous Fluids, Brochure, 2006, 2 pgs.

(Continued)

*Primary Examiner* — Lien Ngo

(74) *Attorney, Agent, or Firm* — Wood, Herron & Evans, L.L.P.

(57) ABSTRACT

A liquid dispensing module includes a dispenser body assembly, a flexible seal, a needle, and an actuator. The dispenser body assembly includes a liquid inlet, a discharge outlet, and a flow channel including a valve seat between the inlet and outlet. The flexible seal engages the dispenser body assembly and includes a downstream end. The needle includes an enlarged portion engaging and retaining the downstream end of the flexible seal to place the flexible seal in lengthwise compression between the enlarged portion and the dispenser body assembly. The needle also includes a valve element that moves between open and closed positions. The flexible seal prevents liquid from leaking out of the flow channel.

21 Claims, 4 Drawing Sheets

U.S. PATENT DOCUMENTS

| | | | |
|---|---|---|---|
| 6,253,957 B1 | 7/2001 | Messerly et al. | |
| 6,334,554 B1 * | 1/2002 | Bolyard et al. | 222/389 |
| 6,343,721 B1 | 2/2002 | Breault | |
| 6,648,006 B1 | 11/2003 | Ostergaard | |
| 6,712,366 B1 | 3/2004 | Cargill | |
| 6,799,702 B1 | 10/2004 | Mercer et al. | |
| 7,156,267 B2 * | 1/2007 | Zanga | 222/504 |
| 7,617,955 B2 | 11/2009 | Riney | |
| 2005/0224513 A1 | 10/2005 | Strong et al. | |
| 2005/0236438 A1 | 10/2005 | Chastine et al. | |
| 2006/0097015 A1 | 5/2006 | Riney | |
| 2006/0108383 A1 | 5/2006 | Byerly | |
| 2006/0124672 A1 | 6/2006 | Penalver Garcia | |

FOREIGN PATENT DOCUMENTS

| | | |
|---|---|---|
| DE | 1036575 B | 8/1958 |
| DE | 1960566 | 5/1967 |
| DE | 3153338 C2 | 6/1989 |
| DE | 3812384 C2 | 10/1989 |
| DE | 4122594 A1 | 11/1992 |
| DE | 10046326 | 4/2002 |
| DE | 20202381 U1 | 7/2002 |
| DE | 202008017338 U1 | 5/2009 |
| EP | 0400846 A2 | 12/1990 |
| EP | 1046809 A2 | 10/2000 |

OTHER PUBLICATIONS

EFD, Compact Diaphragm Valve for Fine Flow Control, Brochure, 2006, 2 pgs.

U.S. Patent and Trademark Office, Office Action in U.S. Appl. No. 10/904,662, Dec. 7, 2006.

U.S. Patent and Trademark Office, Final Office Action in U.S. Appl. No. 10/904,662, May 14, 2007.

European Patent Office, Communication in EP Application No. 10160834, Jul. 28, 2011.

European Patent Office, European Search Report in EP Application No. 10160834, Sep. 22, 2011.

* cited by examiner

LIQUID DISPENSING MODULE

FIELD OF THE INVENTION

This invention generally relates to liquid dispensing devices used for a variety of purposes, but particularly for dispensing viscous liquids such as hot melt adhesives.

BACKGROUND OF THE INVENTION

A typical dispensing device for supplying liquid, such as hot melt adhesive, generally includes a body including a needle having a valve element that opens and closes a dispensing orifice. The needle is usually actuated in at least one direction by pressurized air to dispense discrete amounts of pressurized liquid. A spring mechanism and/or pressurized air is used to move the valve element in an opposite direction against a valve seat, which stops the flow of liquid from the dispensing orifice.

More specifically, liquid dispensing modules include a flow channel adjacent the dispensing orifice and an actuator chamber at an opposite end of the device. The actuator chamber contains a portion of the needle which is typically connected with a piston member and which may also be connected with a spring return mechanism as discussed above. Under air pressure applied on one side of the piston member sufficient to overcome the spring return mechanism, the valve element on the needle is moved in a direction away from the valve seat to discharge liquid. When the air pressure is removed, the spring return mechanism will automatically actuate the needle towards a closed position where the valve element engages the valve seat.

A dynamic seal is typically placed generally between the dispenser body and the moving needle to prevent liquid from the flow channel from leaking into the actuator chamber. Dynamic seals are understood to be seals between two surfaces that move relative to one another. These dynamic seals may press tightly against the needle and cause friction and seal wear. The higher friction may place greater demands on the requirements for pressurized air to move the needle. Even with reduced friction, the dynamic seal will wear over time and lose its ability to seal properly. This inadequate sealing will allow the liquid to enter the actuator chamber to bind the piston and will also allow pressurized air to enter into the flow channel, causing undesired dispensing discontinuities.

One alternative to a dynamic seal is a flexible bellows seal as described in U.S. Patent Application Publication No. 2006/0097015 to Riney. The flexible seal includes one end coupled to the needle and another end coupled to the dispenser body. The ends of the flexible seal can move relative to each other such that there is no frictional engagement between the seal and either of the needle and the dispenser body. It would be desirable to provide a liquid dispensing module that improves on the flexible bellows seal and further addresses the problems with using dynamic seals in a flow channel.

SUMMARY OF THE INVENTION

In one illustrative embodiment, a liquid dispensing module includes a dispenser body assembly, a needle, a flexible seal, and an actuator. The dispenser body assembly includes a liquid inlet, a discharge outlet, and a flow channel that directs a flow of liquid from the liquid inlet to the discharge outlet. The flow channel includes a valve seat between the liquid inlet and the discharge outlet. The flexible seal includes an upstream end sealingly engaging the dispenser body assembly and includes a downstream end. The flexible seal is adapted to seal the flow channel from the actuator. The needle includes a valve element adapted for reciprocating movement in the dispenser body assembly between an open position where the valve element is disengaged from the valve seat and a closed position where the valve element is engaged with the valve seat. Liquid flow through the discharge outlet is allowed in the open position and prevented in the closed position. The needle also includes an enlarged portion engaging and retaining the downstream end of the flexible seal to place the flexible seal in lengthwise compression to promote the sealing function. The downstream end is adapted to move with the needle. The actuator reciprocates the needle between the open and closed positions to selectively dispense liquid from the discharge outlet.

In some embodiments of the liquid dispensing module, the upstream end of the seal is engaged and retained by a recess having a transverse surface formed in the dispenser body assembly to place the flexible seal into lengthwise compression. In the illustrative embodiments, this recess is in a needle guide. The flexible seal may include a central portion between the upstream and downstream ends and flared away from the needle to define an interior cavity. The interior cavity may be pressurized with air from the actuator chamber to prevent the central portion from collapsing onto the needle. The dispenser body assembly can further or alternatively include a needle guide adjustably positioned within the dispenser body assembly to preload the flexible seal with lengthwise compression.

In some embodiments of the liquid dispensing module, the liquid dispensing module includes at least one of an annular groove or an annular recess. In a liquid dispensing module with an annular groove, the annular groove is formed in the enlarged portion of the needle and receives and retains the downstream end of the flexible seal to facilitate placing the seal in lengthwise compression. In a liquid dispensing module with an annular recess, the annular recess is formed in the dispenser body assembly and, more preferably, in the needle guide, and the recess receives and retains the upstream end of the flexible seal to facilitate placing the seal in lengthwise compression. The annular groove or annular recess can include a converging portion. The upstream or downstream end of the flexible seal is wedged into the converging portion to further promote sealing of the flow channel relative to the air actuator portion of the module.

In another aspect, assemblies are provided for use in a liquid dispensing module including the needle guide, needle and seal with any one or more of the features discussed herein.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
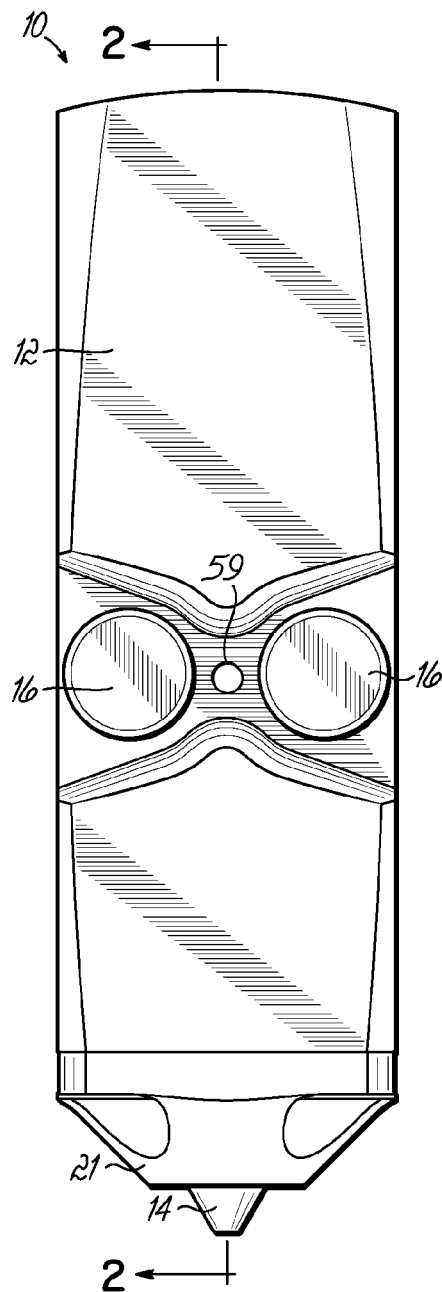
FIG. 1 illustrates one embodiment of a liquid dispensing module.
Figure 2:
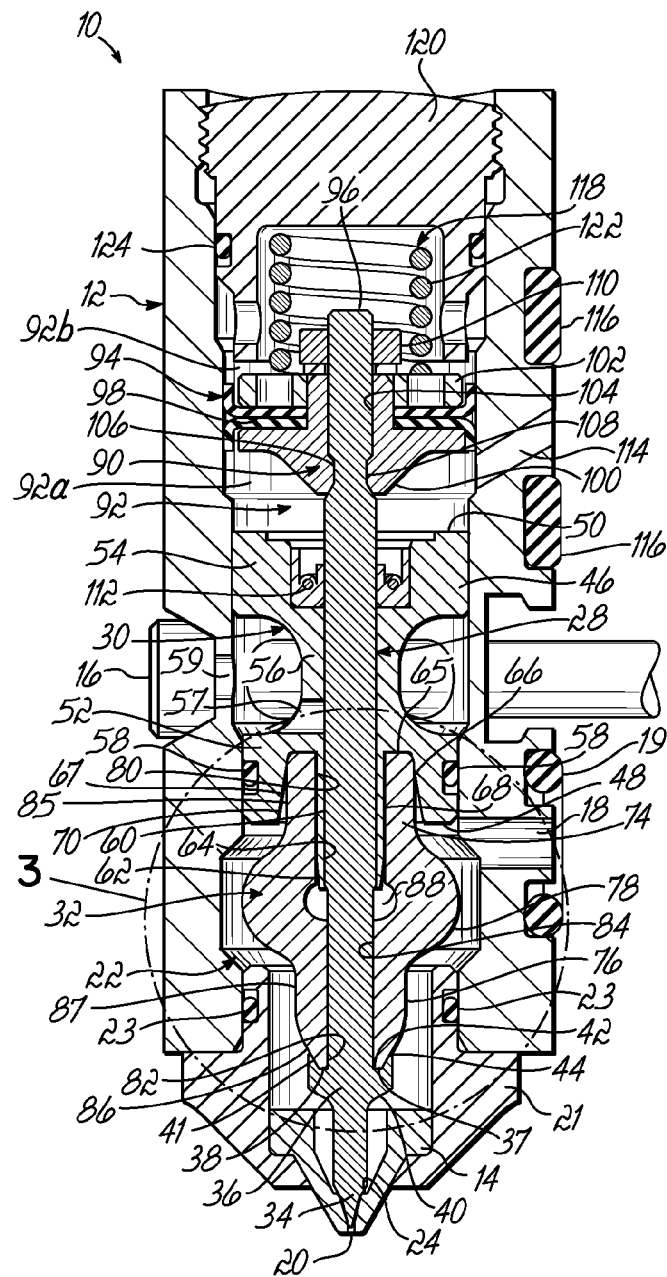
FIG. 2 is a sectional view of the liquid dispensing module of FIG. 1.
Figure 3:
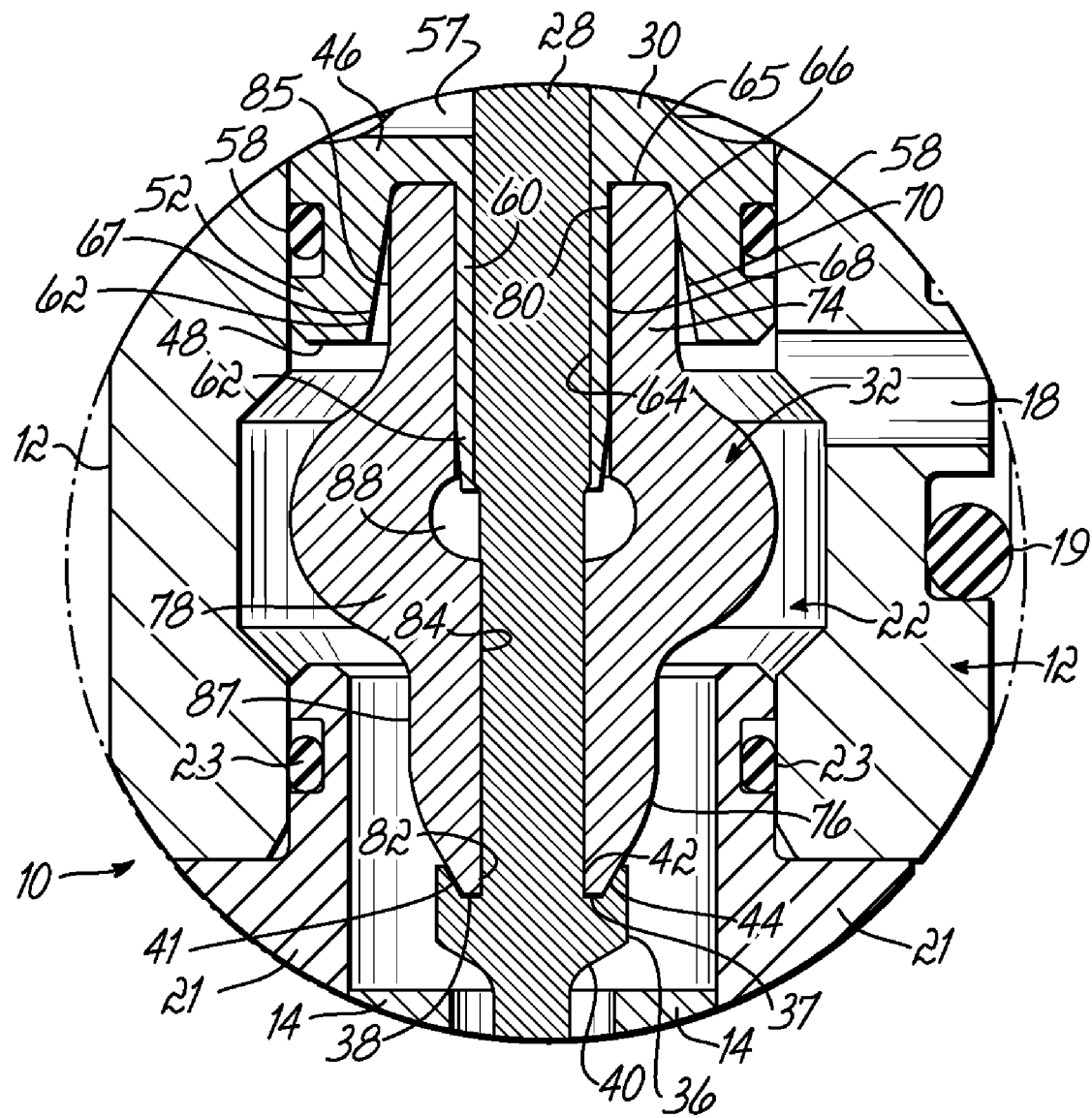
FIG. 3 is an enlarged view of the encircled portion 3 in FIG. 2, further illustrating details of the liquid dispensing module.

With reference to FIG. 1, one embodiment of a liquid dispensing module 10 is illustrated. The exterior appearance of the dispensing module 10 includes a dispenser body assembly 12, a dispensing nozzle 14 from which adhesive or other liquid is dispensed, and fasteners 16 such as bolts for connecting the dispensing module 10 to a gun manifold, or body (not shown). FIGS. 2 and 3 provide a sectional view of the dispensing module 10 and more clearly shows the internal components of or within the dispenser body assembly 12 that operate to dispense liquid from the dispensing nozzle 14 in a controlled manner.

As shown in the illustrative embodiment of FIGS. 2 and 3, the dispenser body assembly 12 has a liquid inlet 18 in the dispenser body assembly 12, a discharge outlet 20 in the dispensing nozzle 14, and a flow channel 22 between the liquid inlet 18 and the discharge outlet 20 capable of directing a flow of the liquid. The liquid inlet 18 includes an inlet seal 19 disposed around the liquid inlet 18 in the dispenser body assembly 12. The dispensing module 10 further includes a nozzle cap 21 coupling the dispensing nozzle 14 with the dispenser body assembly 12. The nozzle cap 21 defines a portion of the flow channel 22 and includes a static seal 23 such as an O-ring between the nozzle cap 21 and the dispenser body assembly 12. The flow channel 22 includes a valve seat 24 adjacent to the discharge outlet 20. The dispensing module 10 further includes a needle 28, a needle guide 30, and a flexible seal 32.

The needle 28 is positioned within the dispenser body assembly 12 and undergoes reciprocating motion. The needle 28 includes a valve element 34 that cooperates with valve seat 24 to selectively dispense liquid from module 10. While the embodiment of FIGS. 2 and 3 includes a needle tip as the valve element 34, alternative forms of valve element 34 such as a ball are possible and within the scope of this invention. The needle 28 reciprocates between an open position and a closed position. In the open position, valve element 34 is disengaged from the valve seat 24 so that a gap is formed between the valve element 34 and the valve seat 24. This gap allows liquid to be dispensed from discharge outlet 20. In the closed position (shown in FIG. 2), valve element 34 is engaged with the valve seat 24 so as to prevent any liquid from being dispensed from the discharge outlet 20. Movement of the needle 28 between the open and closed positions therefore controls the dispensing of liquid from module 10.

The needle 28 further includes an enlarged portion 36 disposed within the flow channel 22. The enlarged portion 36 is adapted to engage and retain one end of the flexible seal 32 to seal the flow channel 22 as discussed in detail below. The enlarged portion 36 may be integrally formed with the needle 28 or, alternatively, may be separately formed and coupled to the needle 28. The enlarged portion 36 defines a second surface 37 transverse to the direction of the needle movement. In the embodiment of FIGS. 2 and 3, the enlarged portion 36 is a flared portion defining an annular groove 38 facing away from the discharge outlet 20 and an opposing fillet radius 40. The annular groove 38 includes the second surface 37. In the illustrated embodiment, the annular groove 38 includes a converging portion 41. The converging portion 41 allows the flexible seal 32 to be wedged into sealable engagement with the annular groove 38. The converging portion 41 may be defined by a first side 42 in the non-enlarged portion of the needle 28 and a second side 44 in the enlarged portion 36. The second side 44 is inwardly tapered towards the first side 42. Alternatively, the first side 42 could be tapered inwardly in alternative embodiments. The second surface 37 and the annular groove 38 are adapted to engage the flexible seal 32.

The dispenser body assembly 12 further includes a needle guide 30 disposed above the flow channel 22. The needle guide 30 may be mounted with a threadable engagement, by interference fit, or by other known methods of coupling two mechanical elements. As will be discussed further below, threadable engagement of the needle guide can be used to facilitate adjustment in the position of the needle guide resulting in an adjustable, lengthwise compression applied to the seal 32. The needle guide 30 maintains the needle 28 vertically aligned within the dispenser body assembly 12 so that, for example, the valve element 34 and valve seat 24 properly engage in the closed position. The needle guide 30 includes a main body portion 46 having a first end 48 oriented towards the discharge outlet 20 and a second end 50. The main body portion 46 has the shape of a cartridge with cylindrical end portions 52, 54 adjacent to the first and second ends 48, 50, respectively, and a narrow central portion 56. The narrow central portion 56 provides space for the aforementioned bolts or fasteners 16 to pass through the dispenser body assembly 12. The cylindrical portion 52 adjacent to the first end 48 includes a static seal 58 such as an O-ring.

The needle guide 30 includes an extension portion 60 projecting below the first end 48 of the main body portion 46. The extension portion 60 is generally cylindrical and may include a slightly tapered end 62 as most clearly shown in FIG. 3. The main body portion 46 and the extension portion 60 include a needle passageway 64 having a length and adapted to receive a portion of the needle 28. The needle 28 moves relative to the needle guide 30 in the needle passageway 64 as the needle 28 reciprocates between the open and closed positions. The narrow central portion 56 may also include a weep hole 57 in fluid communication with the needle passageway 64 and another corresponding weep hole 59 in the dispenser body assembly 12. If the liquid in the flow channel 22 leaks into the needle passageway 64, the liquid will seep through the weep holes 57, 59 and out of the front of the liquid dispensing module 10. The weep holes 57, 59 allow an operator to know if the flexible seal 32 has failed.

The dispenser body assembly 12 further defines a first surface 65 transverse to the direction of needle movement within an annular recess 66. In the illustrated embodiment, the first surface 65 and the recess 66 are formed in the needle guide 30. The recess 66 is adapted to engage and retain one end of the flexible seal 32 to seal the flow channel 22 as discussed in detail below. The annular recess 66 includes a converging portion 67 includes a first side 68 in the extension portion 60 of the needle guide 30 and a second side 70. The second side 70 is inwardly tapered towards the first side 68. The first side 68 could also or alternatively be tapered to assist with wedging the seal 32 into a sealed condition as will be discussed below. The slightly tapered end 62 of the extension portion 60 allows the flexible seal 32 to readily slide onto the extension portion 60 and into the annular recess 66.

Liquid in the flow channel 22 is typically under pressure and will undesirably migrate, or leak, out of the flow channel 22 unless a seal is provided. Thus, the illustrative embodiment of the liquid dispensing module 10 includes the flexible seal 32 as shown in FIGS. 2 and 3. The flexible seal 32 includes an upstream end 74, a downstream end 76, and a central portion 78 between the upstream and downstream ends 74, 76. The central portion 78 is generally thicker in cross-section than the upstream and downstream ends 74, 76. The upstream and downstream ends 74, 76 have respective openings 80, 82, and the flexible seal 32 includes a passageway 84 extending between the first and second openings 80, 82. The passageway 84 is adapted to allow the needle 28 and the extension portion 60 of the needle guide 30 to be disposed partially within the flexible seal 32. The passageway 84 is configured to have a slightly smaller diameter than the corresponding diameters of the needle 28 and the extension portion 60, thereby forming a frictional or interference fit between the flexible seal 32 and the needle 28 and needle guide 30. This interference fit helps seal the flow channel 22 from liquid leaks. The flexible seal 32 is generally arch-shaped. More specifically, the central portion 78 of the flexible seal 32 generally flares radially outward away from the needle 28. Accordingly, an annular interior cavity 88 is formed between the central portion 78 of the flexible seal 32 and the needle 28. The central portion 78 may also be described as bulbous, or the flexible seal 32 may be described as having only one convolution at the central portion 78. The flexible seal 32 has a profile as shown in FIG. 3. The upstream end 74 includes a generally cylindrical portion 85. The downstream end 76 also includes a generally cylindrical portion 87 adjacent to the central portion 78 of the flexible seal 32. On the opposite side of the generally cylindrical portion 87, the downstream end 76 includes an angled tapered portion 86.

The flexible seal 32 is mounted within the liquid dispensing module 10 such that the upstream end 74 is engaged and retained by the needle guide 30 and the downstream end 76 is engaged and retained by the enlarged portion 36 of the needle 28. These engagements of the upstream and downstream ends 74, 76 of the flexible seal 32 places the flexible seal 32 into lengthwise compression. The lengthwise compression allows the flexible seal 32 to effectively seal the flow channel 22 from liquid leaks past the engagement points of the upstream and downstream ends 74, 76. The flexible seal 32 is mounted within the liquid dispensing module 10 such that the upstream end 74 engages the first surface 65 and the downstream end 76 engages the second surface 37.

The upstream end 74 of the flexible seal 32 is wedged into the converging portion 67 between the first and second sides 68, 70 of the annular recess 66 and is held in position because of the converging portion 67. In a similar fashion, the downstream end 76 of the flexible seal 32 is wedged into and retained in the annular groove 38 between the first and second sides 42, 44 and is retained by this converging portion 41. Thus, the flexible seal 32 is placed into lengthwise compression between the annular groove 38 and the annular recess 66. Preferably, this lengthwise compression preload is present when the needle 28 is in the open and closed position.

Accordingly, the flexible seal 32 seals the flow channel 22 from the air actuator section of the module 10, as will be discussed further below. As the needle 28 moves between the open and closed positions, the downstream end 76 of the flexible seal 32 moves with the needle 28 so that there is no relative motion between the flexible seal 32 and the needle 28 where these elements are engaged. The flexible seal 32 is therefore not a dynamic seal in that the needle 28 does not move against the seal 32. Consequently, the flexible seal 32 of the current embodiment does not suffer from the drawbacks associated with conventional dynamic seals used for reciprocating needles, such as frictional wearing of the seal against the needle.

The pressure of the liquid in the flow channel 22 acts upon the flexible seal 32, but the arch-shape of the flexible seal 32 transmits the majority of this liquid pressure force onto the upstream and downstream ends 74, 76 to help ensure sealing engagement of the seal ends 74, 76 within the annular recess 66 and the annular groove 38. The transmission of this liquid pressure force onto the upstream and downstream ends 74, 76 also helps prevent the central portion 78 from collapsing the interior cavity 88 and from coming into contact with the needle 28, which would undermine the benefits of replacing a dynamic seal with the flexible seal 32. The liquid dispensing module 10 may only include one of the annular groove 38 or the annular recess 66 for engagement with the flexible seal 32 in alternative embodiments. In these alternative embodiments, other techniques such as chemical bonding or adhesives can be used to provide sealing engagement of the other seal end 74 or 76. Furthermore, the interference fit between the passageway 84 of the flexible seal 32 and each of the needle 28 and the extension portion 60 of the needle guide 30 also ensures the sealing engagement of the flexible seal 32 with the needle 28 and the needle guide 30.

The flexible seal 32 may be formed from any of a variety of available elastomeric materials or rubbers, such as, for example, the fluoroelastomer marketed as Viton®. When the elastomeric material forming the seal is Viton®, the elastomeric material may have a hardness or durometer in the range of 40-90. In the exemplary embodiment illustrated, the elastomeric material has a durometer of about 65. This durometer is high enough to provide resistance to hydraulic pressure in the flow channel 22 and prevent the central portion 78 of the flexible seal 32 from collapsing onto the needle 28, which undermines the benefits of replacing a dynamic seal with the flexible seal 32. The durometer is also low enough to prevent damping of the needle 28 by the flexible seal 32 as the needle 28 reciprocates from the open position to the closed position. Thus, a durometer in the range of 40-90 for the flexible seal 32 allows the flexible seal 32 to resist a wide range of hydraulic pressures in the flow channel 22 while also not adversely impacting the movements of the needle 28 and the dispensing of liquid from the liquid dispensing module 10.

Additionally, the needle guide 30 may be adjustably positioned within the dispenser body assembly 12 such that the flexible seal 32 is slightly preloaded with compression when the needle 28 is in the closed position. This compression ensures that the upstream and downstream ends 74, 76 of the flexible seal 32 remain respectively engaged with the first surface 65 and the second surface 37 transverse to the movement of the needle. In the illustrated embodiment of FIGS. 2 and 3, the compression ensures that the upstream and downstream ends 74, 76 of the flexible seal 32 stay wedged within the annular recess 66 and the annular groove 38, respectively. As the needle 28 moves toward the open position, the upstream and downstream ends 74, 76 of the flexible seal 32 move toward each other thereby further compressing the central portion 78 of the flexible seal 32. As the needle returns to the closed position, the upstream and downstream ends 74, 76 of the flexible seal 32 move away from each other thereby "stretching" or reducing compression in the central portion 78 of the flexible seal 32. However, the central portion 78 of the flexible seal 32 preferably remains in compression between the needle guide 30 and the needle 28 because of the compression preloading previously described. The flexible seal 32 could also be preloaded with compression in other embodiments by adjusting the position of the enlarged portion 36 on the needle 28, modifying the length of the flexible seal 32 or otherwise making structural modifications that result in the seal 32 being under a preload compression.

The flexible seal 32 provides an additional benefit as well. When the needle 28 is moved to the open position, a gap forms between the valve element 34 and the valve seat 24 near the discharge outlet 20. The pressurized liquid then exerts an upward force on the valve element 34 of the needle 28. Advantageously, the flexible seal 32 is compressed along central portion 78 when the needle 28 is moved to the open position. This compression provides a downward restoring force on the needle 28 to counteract the upward force from the pressurized liquid, thereby hydraulically balancing the needle 28. As noted previously, the durometer of the flexible seal 32 is chosen to not dampen the movement of the needle 28 as well. The hydraulic balancing of forces allows for quicker response when opening and closing the dispensing module, i.e., engaging/disengaging the valve element 34 from valve seat 24 during dispensing operations, which leads to more accurate dispensing of liquid from the dispensing module 10.

The liquid dispensing module 10 of FIG. 2 includes an actuator 90 operatively coupled to the needle 28 and adapted to actuate the needle 28 between the open and closed positions. The actuator 90 is disposed within an actuation chamber 92 disposed above the second end 50 of the needle guide 30. The actuator 90 of this embodiment includes a piston assembly 94 coupled to a top portion 96 of the needle 28. The piston assembly 94 divides the actuation chamber 92 into a lower portion 92a and an upper portion 92b. Piston assembly 94 generally includes a piston seal 98 positioned between a lower piston element 100 and an upper piston element 102. The lower piston element 100 is coupled with the piston seal 98 and the upper piston element 102 and defines a piston passageway 104 through the piston assembly 94. The piston passageway 104 includes an annular projection 106 adapted to mate with a corresponding annular notch 108 formed in the top portion 96 of the needle 28. Additionally, a crimping ring member 110 may be disposed around the top portion 96 of the needle 28 above the piston assembly 94. The piston assembly 94 is held onto the needle 28 by the combination of the crimping ring member 110 and the engagement of the annular projection 106 and annular notch 108. The piston assembly 94 could alternatively be coupled to the needle 28 with alternate fastening means, such as a threaded fastener.

The lower portion 92a of the actuation chamber 92 defines a pressurized air chamber in FIG. 2. The needle guide 30 may further include a dynamic seal 112 disposed around the needle 28 at the second end 50 of the needle guide 30. The dynamic seal 112 is a pneumatic seal that prevents pressurized air from the lower portion 92a of the actuation chamber 92 from leaking into the flow channel 22 and the needle passageway 64 in the needle guide 30. A pressurized air inlet port 114 is connected to the lower portion 92a of the actuation chamber 92 and includes an air inlet seal 116 at the dispenser body assembly 12. When the lower portion 92a of the actuation chamber 92 is pressurized with air from the air inlet port 114, the air exerts a force on the lower piston element 100 that moves the piston assembly 94 and needle 28 upwards to the open position, thereby disengaging the valve element 34 from the valve seat 24.

The actuator 90 may further include a spring-return mechanism 118 coupled to the needle 28 that urges the needle downwards to the closed position where the valve element 34 is engaged with the valve seat 24. The spring return mechanism 118 includes a piston cap 120 and a spring 122. The piston cap 120 is threadably coupled with the dispenser body assembly 12 as shown in FIG. 2 and includes a static seal 124 such as an O-ring between the piston cap 120 and the dispenser body assembly 12. The spring 122 is a compression spring extending between the upper piston element 102 and the piston cap 120. Thus, when the lower portion 92a of the actuation chamber 92 is depressurized, the spring-return mechanism 118 applies a downward force to the piston assembly 94 that causes the valve element 34 to engage with the valve seat 24. The piston cap 120 can be threadably moved along the dispenser body assembly 12 to adjust the amount of spring return force that is provided by the compression spring 122 to oppose movement of the piston assembly 94. Other configurations for the actuator 90 are possible, such as a double acting piston with air chambers on both sides of the piston assembly 94 in the upper portion 92b and the lower portion 92a of the actuation chamber 92, may be used in alternative embodiments of the dispensing module 10. Furthermore, electrical actuators may be used to selectively move the needle between the open and closed positions.

Figure 4:
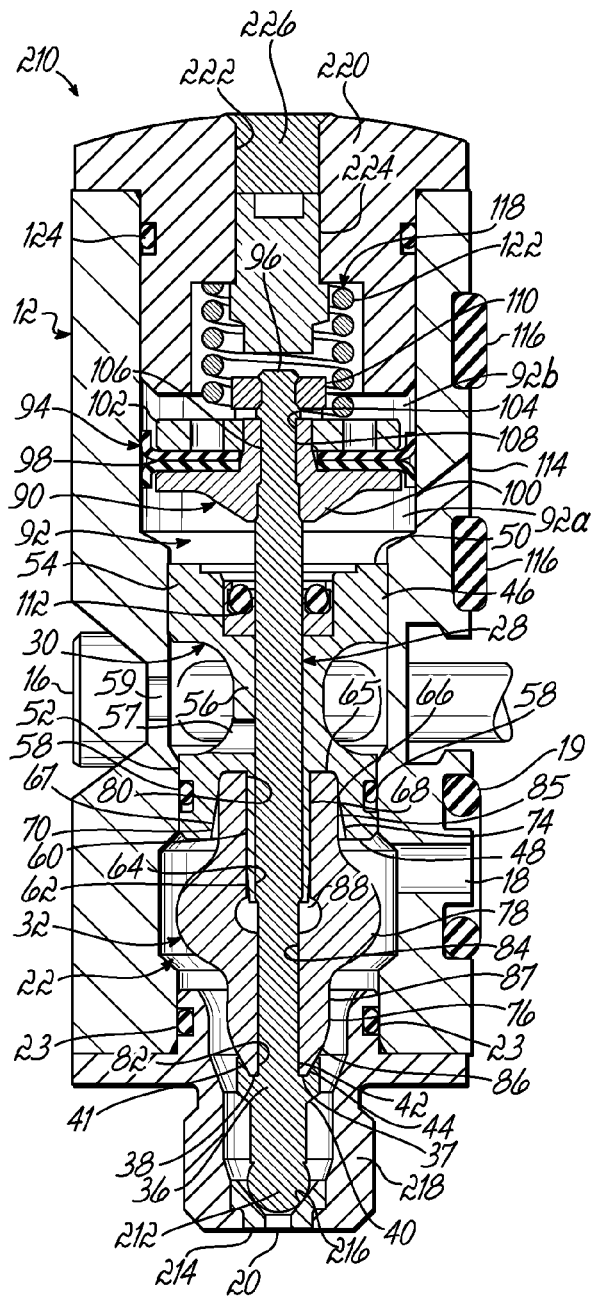
FIG. 4 is a sectional view of an alternative embodiment of the liquid dispensing module.

Referring to FIG. 4, an alternative embodiment of the liquid dispensing module 210 is shown. This embodiment of the dispensing module includes many of the same elements as the previous embodiment, and like reference numerals are used to indicate the same elements described above. The valve element 212 of this embodiment is a ball instead of a needle, and the dispensing nozzle 214 has been modified to include a valve seat 216 appropriate for engaging the ball valve element 212. The nozzle cap 218 is also modified from the previous embodiment, but the nozzle cap 218 still engages the dispensing nozzle 214 and the dispenser body assembly 12 as described above. The piston cap 120 of the previous embodiment has also been replaced with a dispenser cap 220. The dispenser cap 220 is press fit or otherwise engaged with the dispenser body assembly 12 with a static seal 124 such as an O-ring held between these elements. The dispenser cap 220 includes a central aperture 222 holding an adjustment element 224 and a cap seal 226. The adjustment element 224 is a threaded member in the illustrated embodiment. The adjustment element 224 is adapted to engage the top portion 96 of the needle 28 to block further upward movement of the needle 28 when the lower portion 92a of the actuation chamber 92 is pressurized. The adjustment element 224 may be moved up and down with respect to the dispenser cap 220 in order to modify the stroke of the needle 28, or how far the needle 28 may travel upwardly before the adjustment element 224 blocks further upward movement of the needle 28. The cap seal 226 prevents any pressurized air in the upper portion 92b of actuation chamber 92 from escaping the liquid dispensing module 210 through the central aperture 222 of the dispenser cap 220. In each other aspect, the dispensing module 210 includes the elements of the previous embodiment's dispensing module 10, including the flexible seal 32 engaged with a first surface 65 in the needle guide 30 and a second surface 37 in the needle 28.

Figure 5:
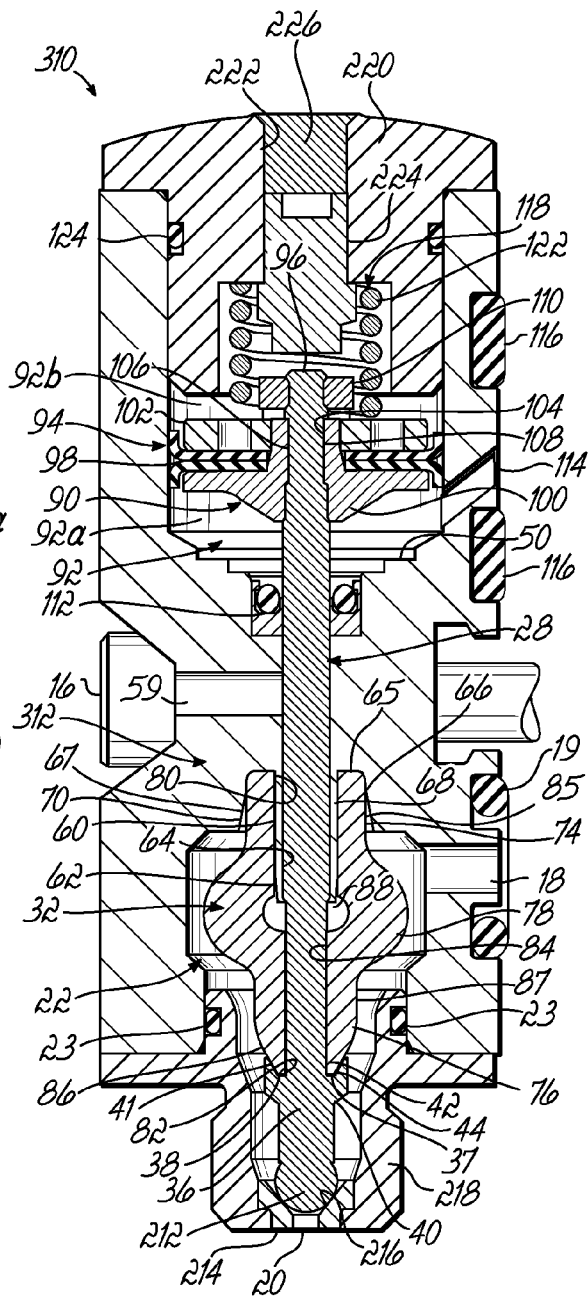
FIG. 5 is a sectional view of an another alternative embodiment of the liquid dispensing module including a needle guide formed integrally with the dispenser body assembly.

Referring to FIG. 5, another alternative embodiment of the liquid dispensing module 310 is illustrated. This embodiment of the dispensing module includes many of the same elements as the previous embodiments, and like reference numerals are used to indicate the same elements described above. In this embodiment the needle guide 30 has been removed and integrally formed as a needle guide portion 312 of the dispenser body assembly 12. The needle guide portion 312 does include a first end 48 facing the flow channel 22 and including an annular recess 66 and an extension portion 60, as well as a second end 50 facing the actuation chamber 92 and including a dynamic seal 112 for engaging the needle 28. In this embodiment, rather than preloading the flexible seal 32 with compression by moving the needle guide 30, the first end 49 of the needle guide portion 312 and the enlarged portion 36 of the needle 28 are located such that the flexible seal 32 is in compression when the needle 28 is in the closed position.

Figures 6, 7:
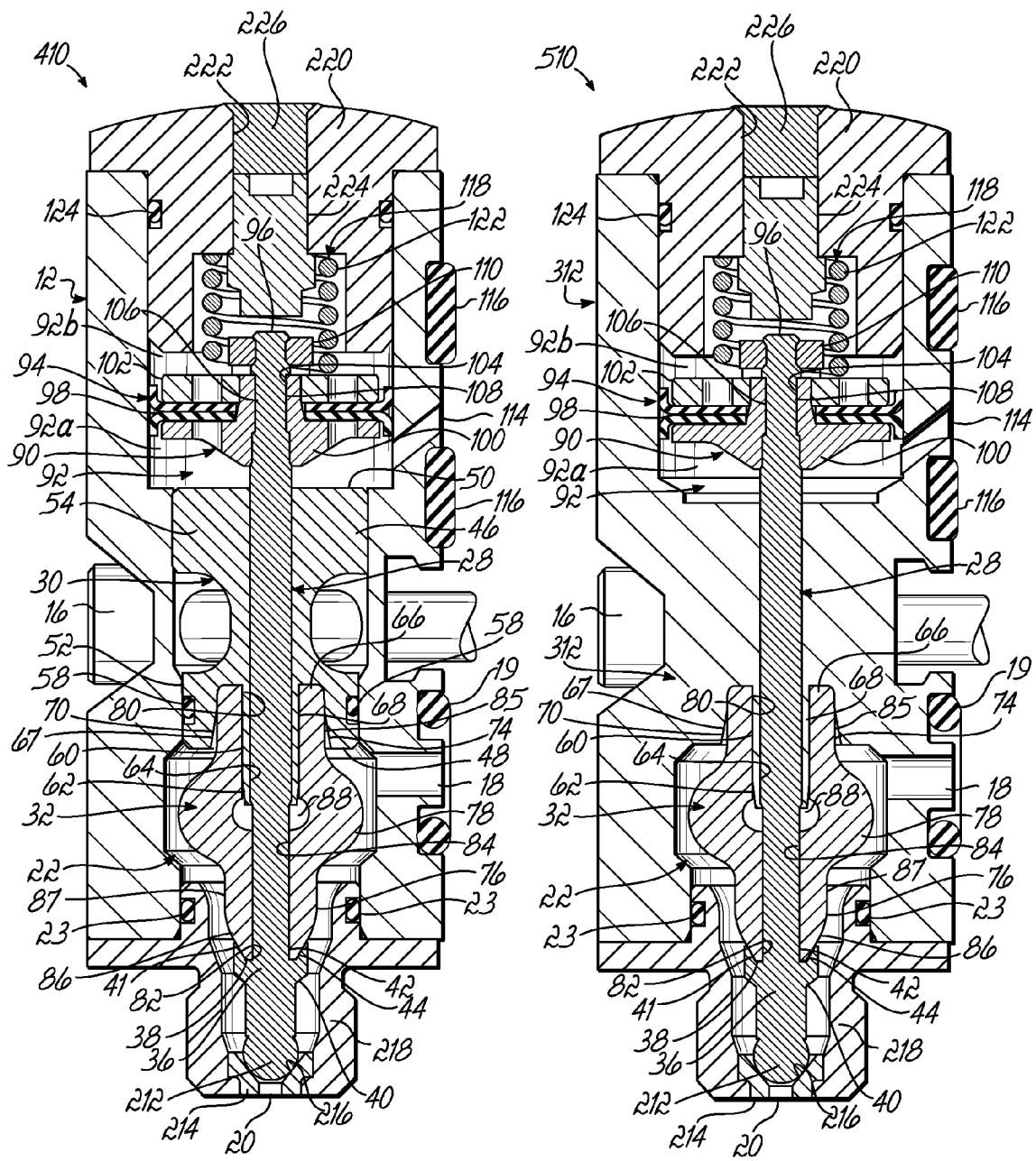
FIG. 6 is a sectional view of an alternative embodiment of the liquid dispensing module including a pressurized interior cavity.
FIG. 7 is a sectional view of an alternative embodiment of the liquid dispensing module including a pressurized interior cavity and including a needle guide formed integrally with the dispenser body assembly.

Referring to FIG. 6, another alternative embodiment of the liquid dispensing module 410 is shown. This embodiment of a dispensing module 410 is substantially identical to the module 210 of FIG. 4, but the pneumatic dynamic seal 112 has been removed from the needle guide 30. Thus, pressurized air is allowed to escape along the needle passageway 64 and pressurize the interior cavity 88 of the flexible seal 32. The weep holes 57, 59 of previous embodiments have also been removed to prevent the pressurized air from leaking directly from the needle passageway 64 outside the liquid dispensing module 10. The pressurized interior cavity 88 will further resist collapse of the flexible seal 32 onto the needle 28 caused by the hydraulic pressure in the flow channel 22, which would undermine the benefits of replacing a dynamic seal with the flexible seal 32. Nevertheless, the upstream and downstream ends 74, 76 of the flexible seal 32 remain sealably engaged in the annular recess 66 and the annular groove 38, respectively, because of the lengthwise compression in the flexible seal 32.

Referring to FIG. 7, another alternative embodiment of the liquid dispensing module 510 is illustrated. This embodiment of a dispensing module 510 is substantially identical to the module 310 of FIG. 5, but the pneumatic dynamic seal 112 has been removed from the needle guide portion 112. Thus, pressurized air is allowed to escape along the needle passageway 64 and pressurize the interior cavity 88 of the flexible seal 32. The weep holes 57, 59 of previous embodiments have also been removed to prevent the pressurized air from leaking directly from the needle passageway 64 outside the liquid dispensing module 10. The pressurized interior cavity 88 will further resist collapse of the flexible seal 32 onto the needle 28 caused by the hydraulic pressure in the flow channel 22, which would undermine the benefits of replacing a dynamic seal with the flexible seal 32. Nevertheless, the upstream and downstream ends 74, 76 of the flexible seal 32 remain sealably engaged in the annular recess 66 and the annular groove 38, respectively, because of the lengthwise compression in the flexible seal 32.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. For example, the needle valve element 34 of FIG. 2 could be used in combination with the modules 410, 510 having no dynamic seal 112 at the needle guide. The various features of the invention may be used alone or in numerous combinations depending on the needs and preferences of the user.

What is claimed is:

1. A liquid dispensing module for dispensing a viscous liquid comprising:
    a dispenser body assembly including a liquid inlet, a discharge outlet, and a flow channel capable of directing a flow of the liquid from said liquid inlet to said discharge outlet, said flow channel including a valve seat between said liquid inlet and said discharge outlet;
    an actuator including an actuator chamber adapted to be in communication with a pressurized air source;
    a flexible seal including an upstream end sealingly engaging said dispenser body assembly and including a downstream end, said flexible seal adapted to seal said flow channel from said actuator; and
    a needle including a valve element and operable by said actuator for reciprocating movement in said dispenser body assembly between an open position in which said valve element is disengaged with said valve seat allowing liquid flow from said discharge outlet and a closed position in which said valve element is engaged with said valve seat preventing liquid flow from said discharge outlet, said needle including an enlarged portion engaging and retaining said downstream end of said flexible seal to allow reciprocating movement of said downstream end with said needle and to place said flexible seal in lengthwise compression between said upstream and downstream ends,
    wherein said flexible seal further includes a central portion between said upstream and downstream ends and extending radially outwardly from said needle to form an interior cavity between said central portion and said needle, and said interior cavity is in fluid communication with said actuator chamber to allow air pressurization of said interior cavity for preventing said central portion from collapsing onto said needle.

2. The liquid dispensing module of claim 1, wherein said dispenser body assembly includes a recess with a transverse surface, said upstream end engaged and retained by said transverse surface to place said flexible seal in lengthwise compression between said transverse surface and said enlarged portion.

3. The liquid dispensing module of claim 1, further comprising:
    an annular groove formed at least partially by said enlarged portion to receive said downstream end of said flexible seal and place said flexible seal in lengthwise compression.

4. The liquid dispensing module of claim 3, wherein said annular groove further comprises a converging portion, and said downstream end of said flexible seal is adapted to be wedged into said converging portion to seal said flow channel and to further provide lengthwise compression in said flexible seal.

5. The liquid dispensing module of claim 1, wherein said dispenser body assembly further comprises an adjustably positioned needle guide adapted to preload said flexible seal with the lengthwise compression.

6. The liquid dispensing module of claim 1, wherein said flexible seal has a durometer of about 65.

7. The liquid dispensing module of claim 1, wherein said flexible seal has a durometer in the range of 40-90.

8. A liquid dispensing module for dispensing a viscous liquid comprising:
    a dispenser body assembly including a liquid inlet, a discharge outlet, and a flow channel capable of directing a flow of the liquid from said liquid inlet to said discharge outlet, said flow channel including a valve seat between said liquid inlet and said discharge outlet, said dispenser body assembly further including a recess with a transverse surface;
    an actuator including an actuator chamber adapted to be in communication with a pressurized air source;
    a needle including a valve element, said needle operable by said actuator for reciprocating movement in said dispenser body assembly between an open position in which said valve element is disengaged with said valve seat allowing liquid flow from said discharge outlet and a closed position in which said valve element is engaged with said valve seat preventing liquid flow from said discharge outlet; and
    a flexible seal including a downstream end sealingly engaging said needle and an upstream end engaged and retained by said transverse surface to place said flexible seal in lengthwise compression between said upstream and downstream ends, said flexible seal adapted to seal said flow channel from said actuator, wherein said flexible seal further includes a central portion extending radially outwardly from said needle to form an interior cavity between said central portion and said needle, and said interior cavity is in fluid communication with said actuator chamber to allow air pressurization of said interior cavity for preventing said central portion from collapsing onto said needle.

9. The liquid dispensing module of claim 8, wherein said recess further comprises a converging portion, and said upstream end of said flexible seal is adapted to be wedged into said converging portion to seal said flow channel and to further provide lengthwise compression in said flexible seal.

10. The liquid dispensing module of claim 8, wherein said dispenser body assembly further comprises an adjustably positioned needle guide adapted to preload said flexible seal with lengthwise compression and further wedge said upstream end of said flexible seal into engagement with said transverse surface of said recess.

11. The liquid dispensing module of claim 8, wherein said flexible seal has a durometer of about 65.

12. The liquid dispensing module of claim 1, wherein said enlarged portion of said needle is spaced in an upstream direction from said valve seat in said flow channel such that said downstream end of said flexible seal remains spaced from said valve seat during the reciprocating movement of said needle.

13. The liquid dispensing module of claim 8, wherein said downstream end of said flexible seal is located so as to remain spaced from said valve seat of said dispenser body assembly during the reciprocating movement of said needle.

14. An assembly for use in a liquid dispensing module for dispensing a viscous liquid, the assembly comprising:
a dispenser body assembly component with an annular recess defining a transverse first surface;
a needle adapted for reciprocating movement in the dispenser body assembly and including a valve element, said valve element movable between an open position and a closed position; and
a flexible seal including a downstream end sealingly engaging said needle and including an upstream end engaged and retained by said transverse surface to place said flexible seal in lengthwise compression between said upstream and downstream ends; and
wherein said annular recess includes first and second sides spaced from one another and configured to engage said upstream end of said flexible seal, each of said first and second sides connected to said transverse first surface, which is oriented transverse to a direction of needle reciprocating movement and engages said upstream end of said flexible seal to apply the lengthwise compression to said flexible seal, said annular recess further including a converging portion defined by said first and second sides converging toward each other as the first and second sides approach said transverse first surface, and said upstream end of said flexible seal is wedged into said converging portion.

15. The assembly of claim 14, wherein said dispenser body assembly component further comprises a needle guide having a passageway, said needle being mounted for reciprocating movement in said passageway.

16. The assembly of claim 15, wherein said needle guide is adjustably positioned with respect to said needle to preload said flexible seal with lengthwise compression.

17. The assembly of claim 14, wherein said flexible seal has a durometer of about 65.

18. The assembly of claim 14, wherein said flexible seal has a durometer in the range of 40-90.

19. The assembly of claim 14, wherein said flexible seal includes an inner sidewall and an outer sidewall, said downstream end terminates in a tip having a transverse end surface extending from said inner sidewall to said outer sidewall of said flexible seal said needle further includes an enlarged portion engaging and retaining said downstream end of said flexible seal, such that said downstream end is adapted to reciprocate with said needle; and the assembly further comprises:
an annular groove formed at least partially by said enlarged portion to receive said downstream end of said flexible seal, said annular groove including a second surface oriented transverse to a direction of needle reciprocating movement and engaging said transverse end surface of said tip such that said transverse end surface and a portion of said outer sidewall of said tip remain contained within said annular groove while said transverse first and second surfaces apply lengthwise compression to said flexible seal.

20. The assembly of claim 19, wherein said annular groove further comprises a converging portion, and said downstream end of said flexible seal is wedged into said converging portion.

21. The assembly of claim 19, wherein said annular groove includes first and second sides spaced from one another and configured to engage said downstream end of said flexible seal, each of said first and second sides connected to said second surface that is oriented transverse to a direction of needle reciprocating movement.

* * * * *